(12) United States Patent
Tanaka

(10) Patent No.: US 7,997,366 B2
(45) Date of Patent: Aug. 16, 2011

(54) VEHICLE BODY STRUCTURE

(75) Inventor: Masahiro Tanaka, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 927 days.

(21) Appl. No.: 11/595,125

(22) Filed: Nov. 9, 2006

(65) Prior Publication Data

US 2007/0102222 A1 May 10, 2007

(30) Foreign Application Priority Data

Nov. 10, 2005 (JP) ................................. 2005-326148
Oct. 6, 2006 (JP) ................................. 2006-275591

(51) Int. Cl.
*B60K 5/00* (2006.01)
(52) U.S. Cl. ........................................ 180/68.3; 180/232
(58) Field of Classification Search ................ 180/68.3, 180/89.1, 311, 312, 291, 232
See application file for complete search history.

(56) References Cited

U.S. PATENT DOCUMENTS

| | | | | | |
|---|---|---|---|---|---|
| 2,789,007 | A | * | 4/1957 | Howell | 454/148 |
| 3,596,978 | A | * | 8/1971 | Wessells et al. | 296/203.02 |
| 3,998,385 | A | * | 12/1976 | Ogle | 237/12.3 B |
| 4,235,298 | A | * | 11/1980 | Sackett et al. | 180/68.3 |
| 4,313,413 | A | * | 2/1982 | Miyoshi | 123/549 |
| 4,332,187 | A | * | 6/1982 | Imai et al. | 454/147 |
| 4,466,654 | A | * | 8/1984 | Abe | 296/192 |
| 4,689,060 | A | * | 8/1987 | Koske | 55/385.3 |
| 4,718,712 | A | * | 1/1988 | Nakatani | 296/192 |
| 4,750,780 | A | * | 6/1988 | Harasaki et al. | 296/192 |
| 4,771,679 | A | * | 9/1988 | Tsuru | 454/146 |
| 4,850,639 | A | * | 7/1989 | Gorski | 296/203.04 |
| 4,881,756 | A | * | 11/1989 | Kumasaka et al. | 280/785 |
| 4,909,566 | A | * | 3/1990 | Hashimoto et al. | 296/192 |
| 4,962,961 | A | * | 10/1990 | Ito et al. | 296/192 |
| 5,061,009 | A | * | 10/1991 | Harasaki et al. | 296/192 |
| 5,120,106 | A | * | 6/1992 | Sakurai et al. | 296/193.02 |

(Continued)

FOREIGN PATENT DOCUMENTS

JP 62-20718 1/1987

(Continued)

OTHER PUBLICATIONS

Japanese Office Action for Application No. 2006-275591 dated Feb. 16, 2011.

*Primary Examiner* — J. Allen Shriver, II
*Assistant Examiner* — Bridget Avery
(74) *Attorney, Agent, or Firm* — Young Basile

(57) ABSTRACT

A vehicle body structure includes a dash panel that partitions an engine chamber from the vehicle interior. An intake manifold for an engine is housed in the engine chamber, and an air box extends in a direction of the width of the vehicle and is located above the dash panel. A linking member is connectible to both the dash panel and the air box. At least a portion of the linking member overlaps a portion of the intake manifold in the direction of the width of the vehicle. When an impact occurs external of the vehicle, the shock to which the dash panel is subjected is transmitted to the air box via the linking member. The rigidity of the dash panel is increased to facilitate fracture of intake manifold, and the dash panel is controlled such that the dash panel is prevented from moving toward vehicle interior.

20 Claims, 11 Drawing Sheets

U.S. PATENT DOCUMENTS

| | | | |
|---|---|---|---|
| 5,127,703 A * | 7/1992 | Takahashi | 296/192 |
| 5,174,258 A * | 12/1992 | Tanaka | 123/198 E |
| 5,368,620 A * | 11/1994 | Chiba et al. | 96/414 |
| 5,630,387 A * | 5/1997 | Kamiyama | 123/184.38 |
| 5,740,876 A * | 4/1998 | Shimose et al. | 180/232 |
| 6,322,440 B1 * | 11/2001 | Nakatani | 454/147 |
| 6,565,620 B1 * | 5/2003 | Greeson | 55/385.3 |
| 6,585,068 B2 * | 7/2003 | Matsushita | 180/90 |
| 6,767,050 B2 * | 7/2004 | Junker et al. | 296/193.02 |
| 6,840,205 B2 * | 1/2005 | Sato et al. | 123/184.21 |
| 6,869,134 B2 * | 3/2005 | Kato et al. | 296/192 |
| 6,883,628 B1 * | 4/2005 | Mizukami et al. | 180/90 |
| 7,004,534 B2 * | 2/2006 | Yoshii et al. | 296/192 |
| 7,096,925 B2 * | 8/2006 | Bracciano | 165/42 |
| 7,185,725 B2 * | 3/2007 | Iwasaka et al. | 180/90 |
| 7,213,668 B2 * | 5/2007 | Richard et al. | 180/68.3 |
| 7,234,555 B2 * | 6/2007 | Khouw et al. | 180/68.3 |
| 7,303,042 B2 * | 12/2007 | Kanehira et al. | 180/291 |
| 2005/0006168 A1 * | 1/2005 | Iwasaka et al. | 180/292 |

FOREIGN PATENT DOCUMENTS

| | | |
|---|---|---|
| JP | 62-020718 | 1/1987 |
| JP | 3-81128 | 8/1991 |
| JP | 2002-213313 A | 7/2002 |

* cited by examiner

VEHICLE BODY STRUCTURE

CROSS-REFERENCES TO RELATED APPLICATIONS

This application claims priority from Japanese Patent Application Serial Nos. 2005-326148, filed Nov. 10, 2005 and 2006-275591, filed Oct. 6, 2006, which are incorporated herein in their entirety by reference.

TECHNICAL FIELD

The present invention relates in general to a vehicle body structure.

BACKGROUND

There are known chassis front structure devices. For example, in Japanese Kokai Patent Publ. No. 62-20718, a chassis front structure is used to control the dash panel so that the dash panel does not move into the vehicle interior when an impact occurs at the front of the vehicle. An engine air intake path having a surge tank and an intake manifold is disposed between the engine body and the dash panel and a projection is furnished on the dash panel. When an impact occurs at the front of the vehicle, the projection thrusts into the air intake path, separating the surge tank and intake manifold, preventing the surge tank from pushing against the dash panel, and therefore, preventing the dash panel from moving into the vehicle interior.

SUMMARY

Disclosed herein is a vehicle body structure that is more capable than known structures of controlling the dash panel, preventing it from moving into the vehicle interior when an impact occurs external of the vehicle.

According to one example, a vehicle body structure comprises a dash panel partitioning an engine chamber of the vehicle from a vehicle interior, an engine intake manifold disposed in the engine chamber, an air box extending in a direction corresponding to a width of the vehicle and located above the dash panel and a linking member connected to the dash panel and the air box, at least a portion of the linking member overlapping at least a portion of the intake manifold in the direction corresponding to the width of the vehicle.

According to another example, the vehicle body structure comprises means for partitioning an engine chamber at a front of a vehicle from a vehicle interior positioned in back of the partition means, means for intaking engine air, the air intake means disposed toward the front of the vehicle from the partition means, and means for linking the partition means and an air box, at least a part of the linking means overlapping at least a portion of the air intake means in a direction of a width of the vehicle.

The vehicle body structure can also comprise a dash panel partitioning an engine chamber from a vehicle interior, an engine intake manifold disposed in the engine chamber and a linking member connected to the dash panel and connectible to an air box, at least a portion of the linking member overlapping at least a portion of the intake manifold in a direction of the width of the vehicle.

Embodiments of the invention also include a linking member for a vehicle body structure where the vehicle includes a dash panel partitioning an engine chamber from a vehicle interior, the engine chamber housing an engine and an engine intake manifold, and wherein the vehicle includes an air box located above the dash panel. The linking member comprises a first end connectible to the air box and a second end connectible to the dash panel. The first end and the second end are connectible respectively to the air box and the dash panel so that at least a portion of the linking member overlaps at least a portion of the intake manifold in a direction corresponding to a width of the vehicle

BRIEF DESCRIPTION OF THE DRAWINGS

The description herein makes reference to the accompanying drawings wherein like reference numerals refer to like parts throughout the several views, and wherein:

FIG. 6 illustrates an intake manifold in the vehicle body structure in accordance with the first application example, where

DETAILED DESCRIPTION

Figure 1:
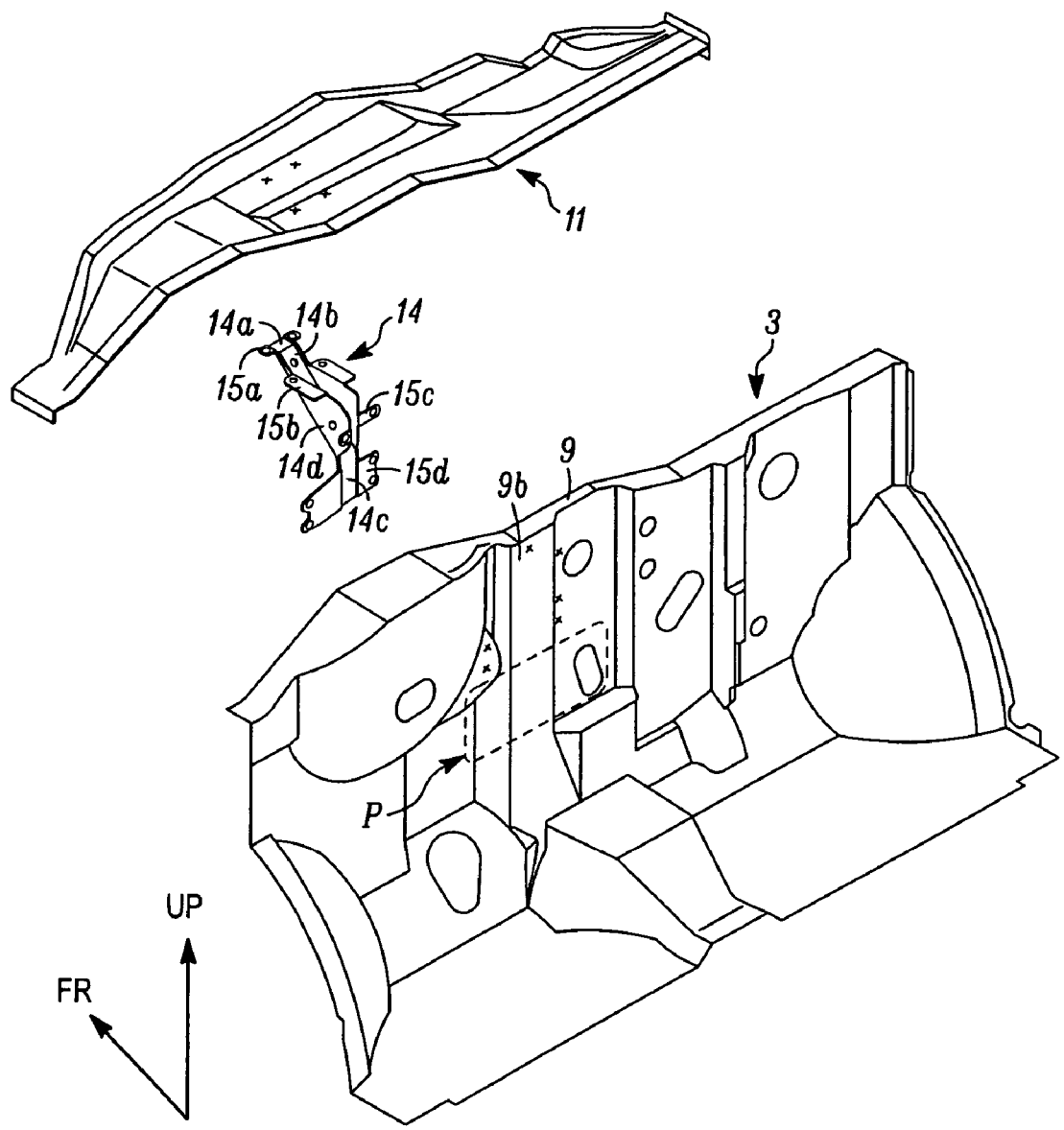
FIG. 1 is an exploded oblique view illustrating a vehicle body structure in accordance with the first application example.

With the structure of Japanese Kokai Patent Publ. No. 62-20718 referenced above, while backward movement of the surge tank can be controlled, the separated intake manifold is not controlled and is moved backward. The dash panel is subjected to a force exerted by the intake manifold, and there is a risk that the dash panel cannot be sufficiently controlled so that it will not move into the vehicle interior.

In contrast, according to embodiments herein, a vehicle body structure includes a linking member connected to both the dash panel and the air box at the position where the linking member and the intake manifold overlap horizontally, and the load to which the dash panel is subjected when an impact occurs can be transmitted to the air box via the linking member. The rigidity of the dash panel is also increased relative to the intake manifold, making it easier to fracture the intake manifold. The dash panel is controlled such that it is prevented from extending into the vehicle interior.

Referring now to the figures, a vehicle body structure, shown by example as a chassis front structure, includes a dash panel 3 that partitions an engine chamber 1, in which an engine 18 or the like is housed, and a vehicle interior 2 furnished at the rear of the dash panel. An air box 11 is located above the dash panel 3 and extends horizontally further to the top UP and front FR than dash panel 3. A linking member 14 made of metal is connected to both dash panel 3 and air box 11.

Figure 4:
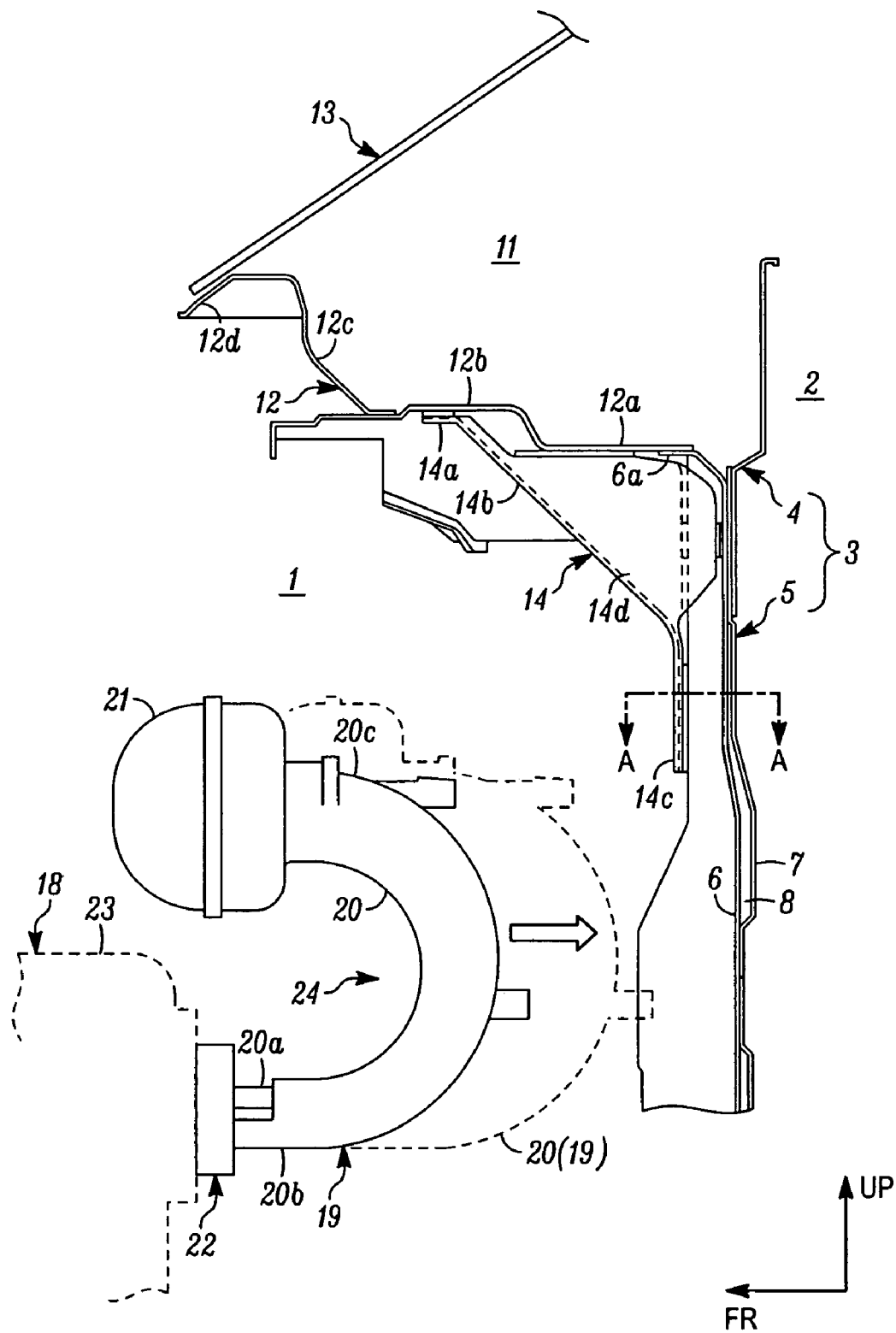
FIG. 4 is a longitudinal cross-section illustrating the vehicle body structure in accordance with the first application example.
Figure 5:
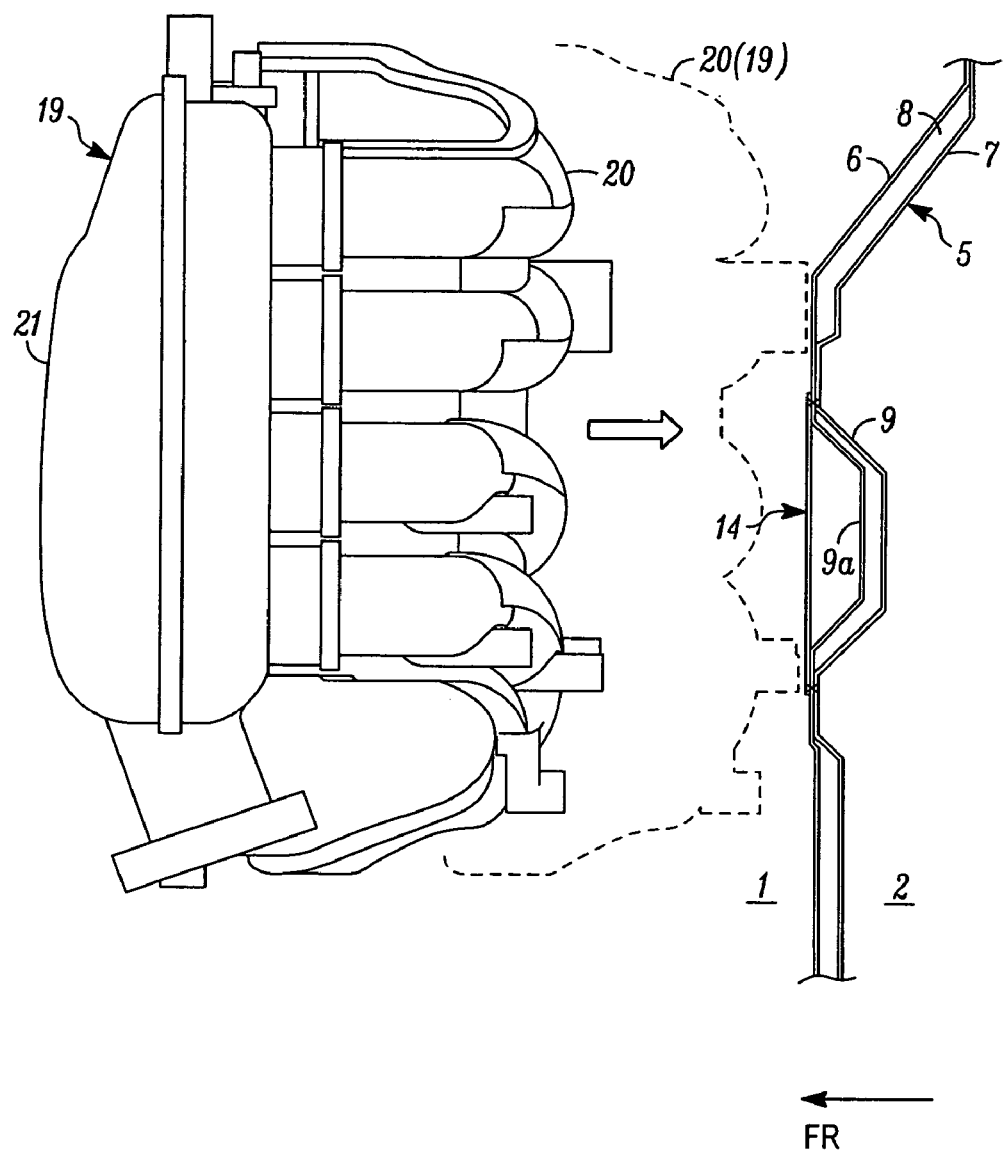
FIG. 5 is a plan view illustrating the vehicle body structure in accordance with the first application example (including cross-section A-A in FIG. 4)

The dash panel 3, as shown in FIGS. 4 and 5, has an upper dash 4 and a dash floor 5 as the vertical wall furnished at the back end of engine chamber 1. The dash floor 5 has a front member 6 and a back member 7. Sound absorbing material 8 for suppressing noise is placed in the gap formed between front member 6 and back member 7.

A mounting flange 6a is formed at the top end of front member 6. The mounting flange 6a is bent forward horizontally. The dash panel 3 and air box 11 are joined together by connecting the mounting flange 6a to the lower surface of the rear edge of the floor 12 of the air box 11.

As shown in FIG. 1, a reinforcing part 9 extends vertically causing the center part of dash floor 5 to bulge rearward in the longitudinal direction of the vehicle, increasing the rigidity of the dash floor 5. A recess 9a, which is recessed rearward of the dash panel 3, is formed in the reinforcing part 9 of the dash floor 5 as shown in FIG. 5.

The reinforcing part 9 extends vertically at the rear of engine 18 in the longitudinal direction of the vehicle and penetrates vertically through a region P (FIG. 1) in which dash panel 3 is pushed by a force exerted by the engine 18 when an impact occurs at the front FR of the vehicle. The top end 9b of reinforcing part 9 is connected to the air box 11.

The air box 11, as shown in FIG. 4, has an air box floor 12 constituting the bottom and front walls of air box 11. The upper dash 4 extending above dash floor 5 forms the back wall of air box 11, and a cover member (not shown) covering the top of the air box floor 12 and upper dash 4 constitutes the top wall of the air box 11. External air that is directed into vehicle interior 2 is taken into the cavity formed by the air box floor 12, the upper dash 4 and the cover member (not shown).

The air box floor 12, as shown in FIG. 4, is formed by joining the front wall 12c to the bottom wall 12b. The back end of bottom wall 12b is bent into a crank shape, forming a mounting flange 12a. The mounting flange 6a of the dash panel 3 is joined to the bottom surface of the air box mounting flange 12a as described above. The top end of the front wall 12c is bent forward and angled downward, forming an angled wall 12d. The windshield glass 13 is mounted on the angled wall 12d.

Figure 2:
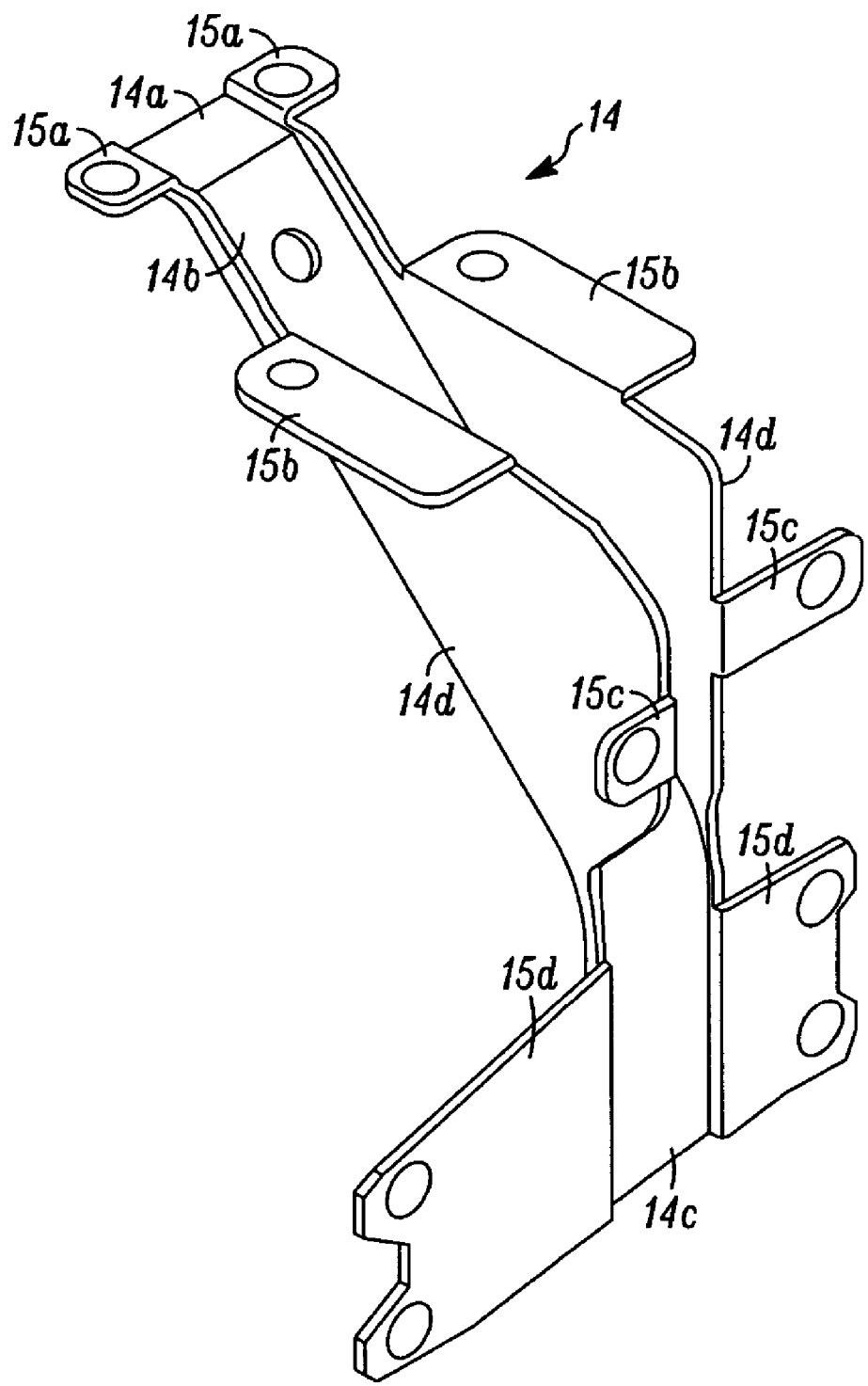
FIG. 2 is an enlarged oblique view of a linking member in accordance with the first application example.

The linking member 14, as shown in FIGS. 1 and 2, has a horizontal piece 14a, an angled piece 14b on which a pair of side walls 14d are formed, and a vertical piece 14c. The pair of side walls 14d, as shown in FIG. 4, are shaped corresponding to the corner part formed by the dash floor 5 and the air box 11 viewed from the side.

A mounting flange 15a is furnished on the horizontal piece 14a, mounting flanges 15b and 15c are formed on the side walls 14d, and a mounting flange 15d is formed on the vertical piece 14c. The linking member 14 is directly connected to the dash panel 3 and the air box 11 by spot welding mounting flanges 15a and 15b to the air box 11 and mounting flanges 15c and 15d to the dash panel 3.

One side of mounting flange 15c is spot welded to the reinforcing part 9 of the dash floor 5. The rigidity of the reinforcing part 9 is further increased by placing one side wall 14d of the linking member 14 inside the recess 9a of the reinforcing part 9. The mounting flange 15d is also joined to dash floor 5, extending between both edges of recess 9a. A closed cross-section is formed by the dash floor 5 and the mounting flange 15d, thereby further increasing the rigidity of reinforcing part 9.

As shown in FIG. 4, the horizontal piece 14a of linking member 14 is connected to the front end of the bottom surface of bottom wall 12b of air box floor 12, and vertical piece 14c of linking member 14 is connected to dash floor 5. Side walls 14d furnished on the angled piece 14b of the linking member 14 are disposed at the corners formed by the dash floor 5 and the air box 11. This configuration increases the supporting rigidity of the air box 11 and the supporting rigidity of windshield glass 13.

Figure 3:
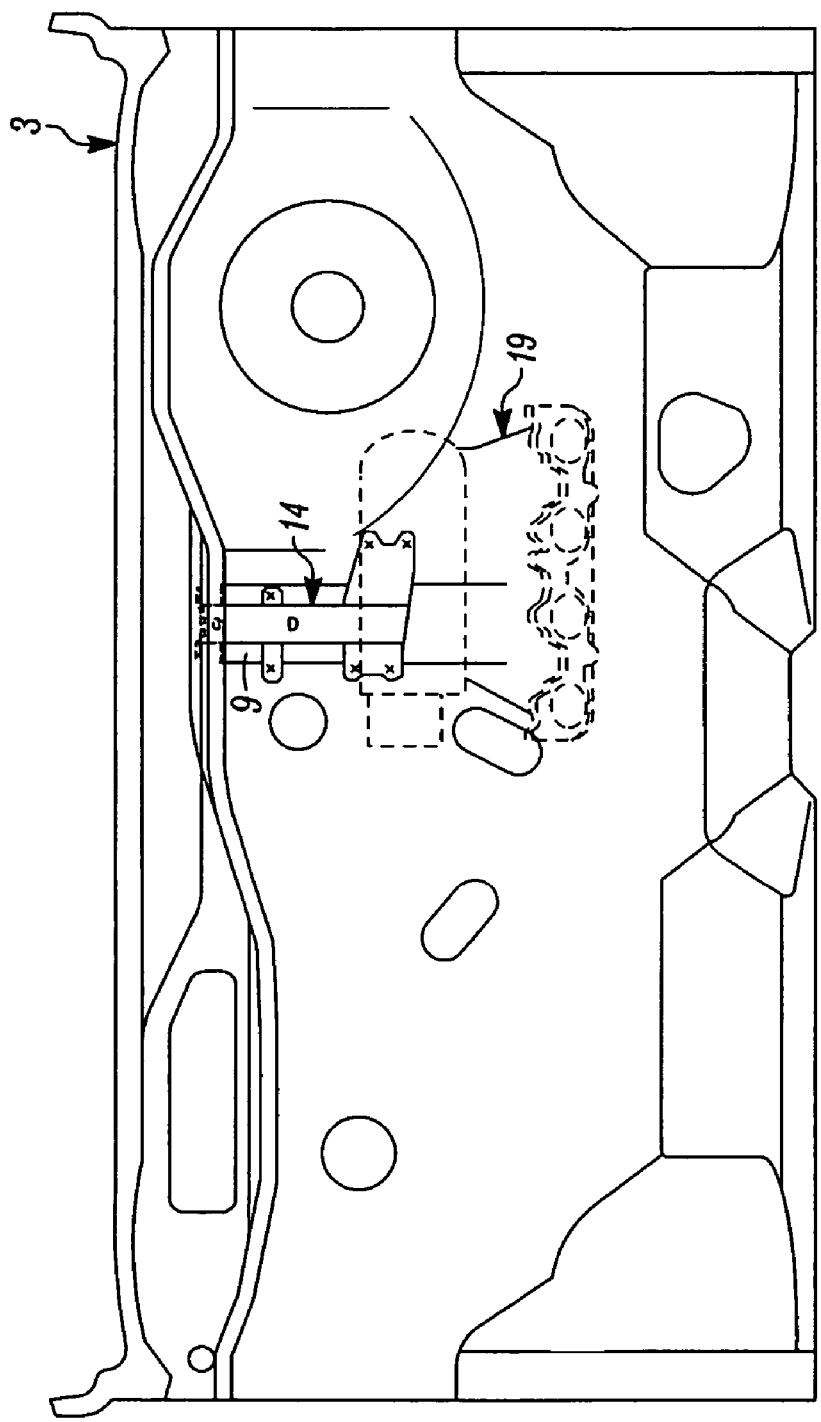
FIG. 3 is a front view illustrating the vehicle body structure in accordance with the first application example.

As shown in FIG. 3, the linking member 14 is joined such that at least a portion of linking member 14 and intake manifold 19, described below, overlap horizontally.

The linking member 14 is connected to dash panel 3 and the air box 11 by first spot welding linking member 14 to dash panel 3 and then spot welding the linking member 14 to air box 11.

At the same time, engine 18 is disposed transversely, and the intake manifold 19, which is made of resin, is installed to the rear of engine 18 in the longitudinal direction of the vehicle. That is, the intake manifold 19 is disposed adjacent the dash panel 3 between the engine 18 and the dash panel 3.

Referring now to FIGS. 4-6, 9 and 10, the intake manifold 19 has multiple tubular branch parts 20 furnished for each cylinder of engine 18 and a tubular collector 21 that collects upstream side ends 20c of branch parts 20. The downstream side ends (ends at which intake manifold 19 and engine 18 are connected) 20b of branch parts 20 are connected to the back surface of cylinder head 23 of engine 18 by a mounting flange 22 that is unified for multiple branch parts 20. The upstream side in the air intake flow direction and the downstream side in the intake flow direction in the intake manifold are referred to as the upstream side and the downstream side.

Figure 6A:
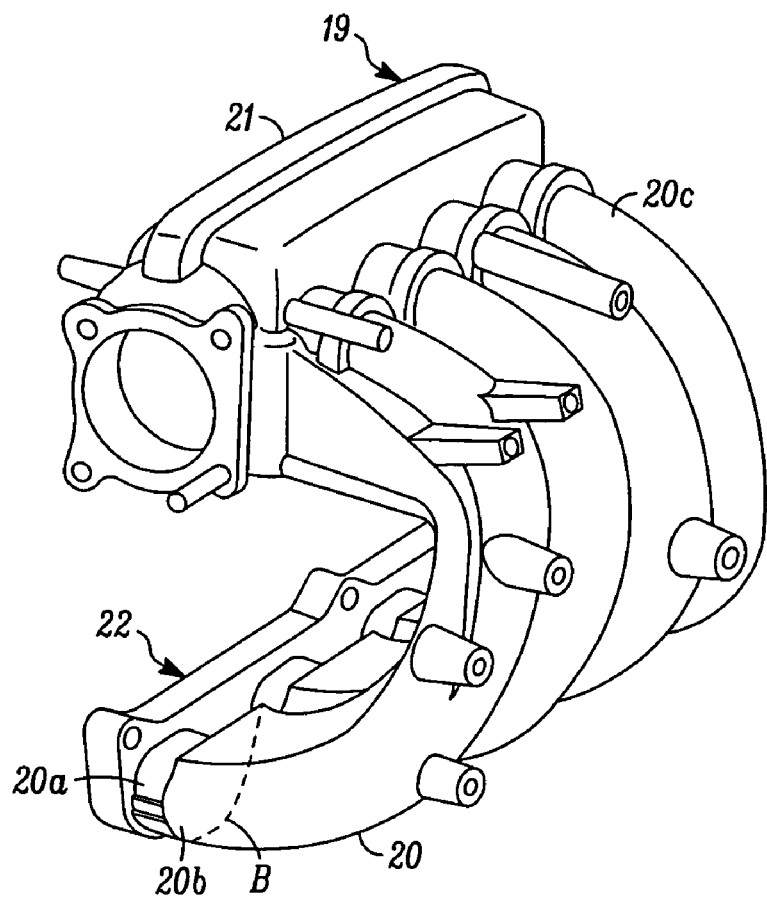
FIG. 6A illustrates an oblique view and FIG. 6B is cross-section B in FIG. 6A.
Figure 6B:
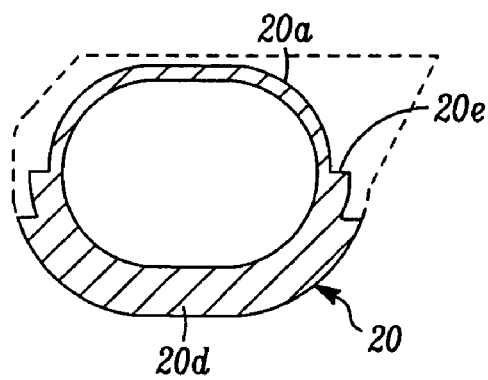

Branch parts 20 are formed curved into an approximate U-shape. The opening 24 in the U-shape is directed forward of the vehicle and the upstream side ends 20c are disposed on top and the downstream side ends 20b on the bottom. A fragile part 20a is also furnished for downstream side ends 20b. The fragile part 20a is produced by forming a peripheral wall 20d of downstream side end 20b as thin steps. As shown in FIG. 6, a step 20e is furnished on the surface around the outside of peripheral wall 20d at the top of downstream side end 20b, and a fragile part 20a is formed in the intake manifold 19 by forming the peripheral wall 20d as thinner steps toward the top. In this configuration, an intake manifold 19 can have a top part easily bent toward the front starting at fragile part 20a.

Figure 7:
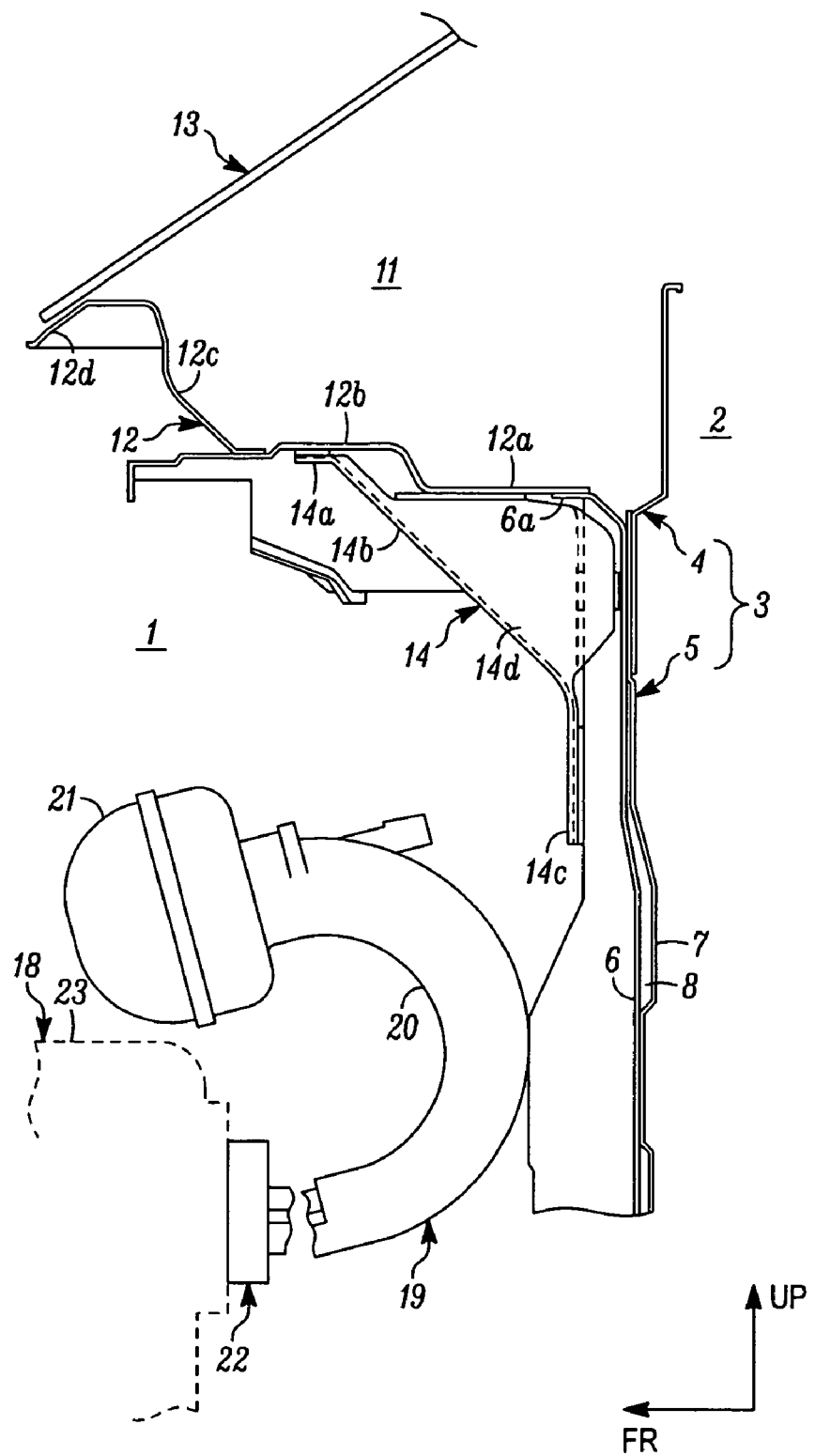
FIG. 7 is a longitudinal cross-section of the vehicle body structure when an impact occurs at the front of the vehicle in accordance with the first application example.

When impact occurs at the front FR of the vehicle, engine 18 and intake manifold 19 move rearward of the vehicle with deformation of the chassis. As indicated by the dashed line in FIGS. 4 and 5, the rear of the intake manifold 19, specifically the branch part 20, touches dash panel 3. In addition, when engine 18 and intake manifold 19 are moved toward the back of the vehicle, the intake manifold 19 is subjected to a resistance force from dash panel 3, and as shown in FIG. 7, is bent forward starting at fragile part 20a.

A pushing force is applied toward the rear in the longitudinal direction of the vehicle, against dash panel 3 from intake manifold 19 or engine 18, and a tensile load is applied to the air box 11 from linking member 14 as a result of the linking member 14 connecting the dash floor 5 and air box 11 at an angle.

Linking member 14 is connected to dash panel 3 and air box 11 at a position such that at least a portion of linking member 14 and intake manifold 19 overlap in a direction corresponding to the width of the vehicle, so that the load the dash panel 3 is subjected to by the intake manifold 19, which has been forced toward the rear of the vehicle at the time of impact at the front FR of the vehicle, can be transmitted to the air box 11 through linking member 14. The rigidity of dash panel 3 is increased relative to intake manifold 19, and the intake manifold 19 is easily fractured. Therefore, the dash panel 3 can be controlled so that it is not moved into the vehicle interior 2, and thus there is an advantage in that the degree of freedom of layout in vehicle interior 2 is increased to the extent that the crush length established in vehicle interior 2 can be shortened.

Linking member 14 is connected to both dash panel 3 and air box 11 by spot welding, allowing the joint strength of linking member 14 to easily be adjusted. Also, because linking member 14 is directly connected to both dash panel 3 and air box 11, an increase in the number of components for linking member 14 is limited, which is beneficial in terms of cost. In addition, a lighter weight can be achieved for the vehicle body structure.

Also, the reinforcing part 9 is furnished on dash panel 3 so the rigidity of dash panel 3 is increased, resulting in better control of the movement of the dash panel 3 and preventing the dash panel 3 from being moved into vehicle interior 2.

Since one side wall 14*d* of linking member 14 is put inside recess 9*a* of reinforcing part 9, the rigidity of reinforcing part 9 is increased. In addition, a closed cross-section structure is formed by the mounting bracket 15*d* being joined to reinforcing part 9 of dash panel 3 extending between both edges of recess 9*a*. This configuration further increases the rigidity of reinforcing part 9, and deformation of dash panel 3 can be better controlled.

By furnishing reinforcing part 9 to penetrate vertically through the region P in which dash panel 3 is pushed by the force of the engine 18 extending rearward, the pushing force from engine 18 is impelled to act directly on reinforcing part 9, increasing the reinforcing effect by reinforcing part 9 of dash panel 3.

By connecting top end 9*b* of reinforcing part 9 to air box 11, the pushing force from engine 18 is distributed to air box 11 from reinforcing part 9 through the top end, and dash panel 3 can be better controlled so that it does not move rearward into vehicle interior 2.

Since linking member 14 is connected to reinforcing part 9 as described above, the pushing force from engine 18 can be more reliably transmitted to air box 11 through reinforcing part 9 and linking member 14, and dash panel 3 can be better controlled so that it does not move rearward into vehicle interior 2.

Horizontal piece 14*a* of linking member 14 is connected to the front end of the bottom surface of bottom wall 12*b* of air box floor 12, and vertical piece 14*c* of linking member 14 to dash floor 5. Side walls 14*d* furnished on angled piece 14*b* of linking member 14 are disposed at the corners formed by dash floor 5 and air box 11, increasing the support rigidity of air box 11 and the support rigidity of windshield glass 13.

Since the horizontal piece 14*a* of linking member 14 is connected to the front end of the bottom surface of bottom wall 12*b* of air box floor 12 and vertical piece 14*c* of linking member 14 to dash floor 5, and side walls 14*d* furnished on angled piece 14*b* of linking member 14 are also disposed at the corners formed by dash floor 5 and air box 11, the support rigidity of air box 11 and the support rigidity of windshield glass 13 can be increased. There is also an advantage that the occurrence of noise caused by vibration of windshield glass 13 can be controlled.

The fragile or brittle parts 20*a* are furnished for intake manifold 19 so that the intake manifold 19 is bent when an impact occurs at the front FR of the vehicle and the load to which dash panel 3 is subjected at that time can be absorbed. So, dash panel 3 can be better controlled so that it does not move in the rearward direction toward vehicle interior 2. If linking member 14 is impelled to touch the intake manifold 19, the intake manifold 19 can be more reliably fractured.

Fragile or brittle parts 20*a* are furnished at the ends connected to downstream side ends 20*b*, that is, with engine 18 touching the base part of intake manifold 19 projecting from engine 18 toward dash panel 3. When bending occurs, since nearly all of intake manifold 19 is not rigidly joined to engine 18, the permissible amount for engine 18 to come back before a substantial pushing force is applied to dash panel 3 can be increased, and a vehicle body structure can be obtained such that it is that much more difficult for a pushing force from the engine 18 to act on dash panel 3 when there is impact at the front FR of the vehicle.

Intake manifold 19 is formed bent into an approximate U-shape with downstream side ends 20*b* downward, upstream side ends 20*c* upward, and opening 24 directed towards the front FR of the vehicle. The fragile parts 20*a* are furnished in peripheral walls 20*d* of downstream side ends 20*b*. When bending occurs, at least a part of intake manifold 19 can move rotatingly in the space above engine 18, and a chassis front structure can be obtained such that it is even more difficult for a pushing force to act on dash panel 3 from engine 18.

At the same time, steps 20*e* are furnished in the surface around the outside of the top of peripheral walls 20*d* of downstream side ends 20*b*, and the peripheral walls 20*d* are formed as thinner steps toward the top. Since fragile parts 20*a* are formed in intake manifold 19, the fragile parts 20*a* can be formed easily, and since the surface around the outside of peripheral wall 20*d* is formed as thin steps, it is not necessary to form a step shape in the surface around the inside, and there is no adverse effect on the air flowing inside intake manifold 19.

Figure 8:
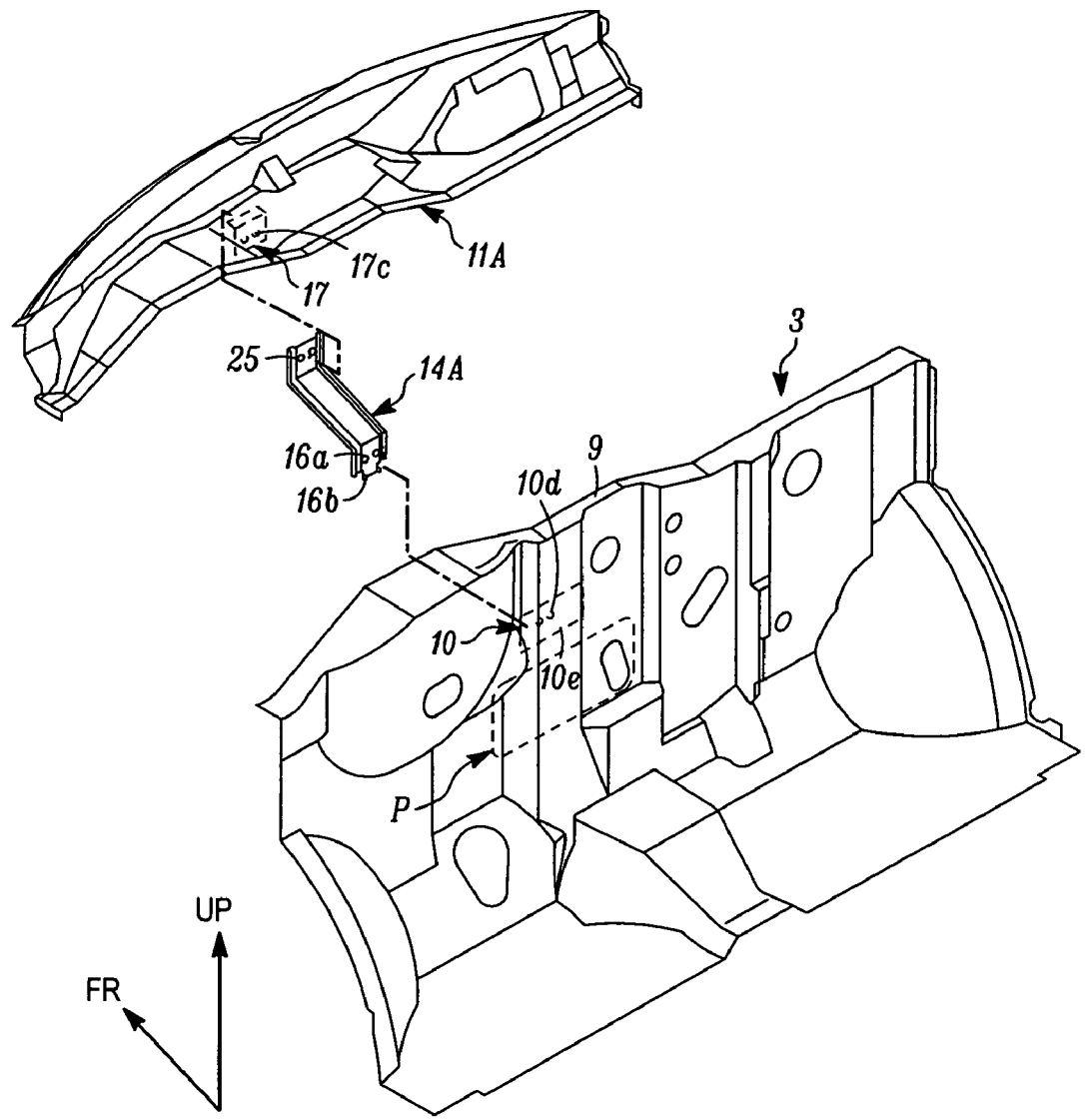
FIG. 8 is an exploded oblique view illustrating the vehicle body structure in accordance with the second application example.

In an alternative embodiment, the vehicle body structure as shown in FIG. 8 has a dash panel 3 that partitions an engine chamber 1, in which an engine 18 or the like is housed, and a vehicle interior 2 located in back of the dash panel 3, an air box 11A located above the dash panel 3 and extending horizontally more to the top UP and front FR than dash panel 3, and a linking member 14A made of metal and connected to both dash panel 3 and air box 11A.

Air box 11A in this embodiment differs from air box 11 in the first embodiment in that bottom wall 12*b*A and front wall 12*c*A of air box floor 12A are integrally formed. The back end of bottom wall 12*b*A is also bent into a crank shape to form a mounting flange 12*a*A, and mounting flange 6*a* of dash panel 3 is joined to the bottom surface of the mounting flange 12*a*A. The top end of front wall 12*c*A is also bent forward and downward at an angle to form angled wall 12*d*A, and windshield glass 13 is mounted on the angled wall 12*d*A.

Figure 9:
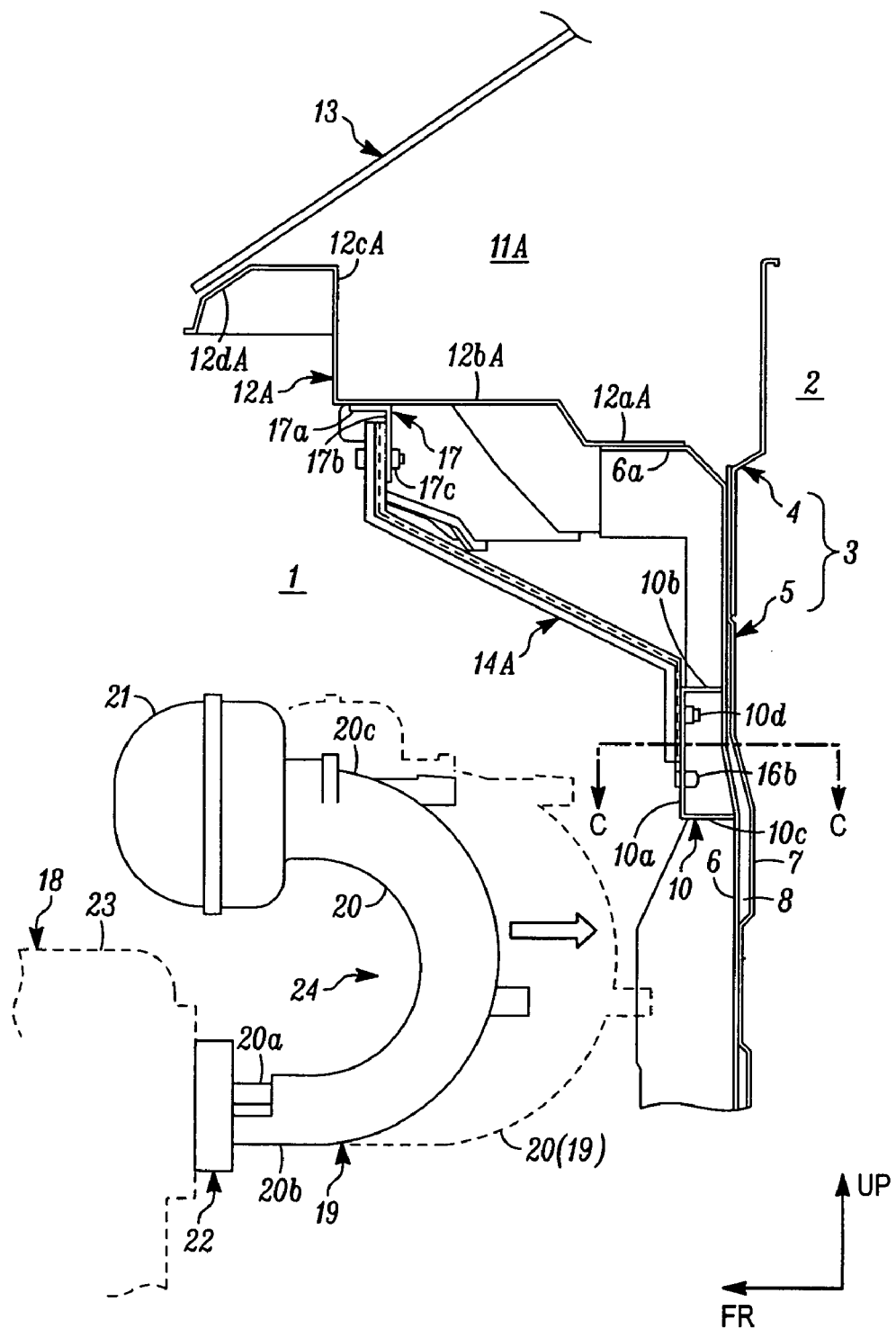
FIG. 9 is a longitudinal cross-section illustrating the vehicle body structure in accordance with the second application example.

The reinforcing part 9 is further reinforced by a reinforcement member 10 made of metal. As shown in FIG. 9, the reinforcement member 10 has an approximate c-shaped cross-section that has a ceiling wall 10*a*, and a top wall 10*b* and a bottom wall 10*c* forming a pair above and below it. Top wall 10*b* and bottom wall 10*c* have a trapezoidal shape to match the shape of recess 9*a*. Top wall 10*b* and bottom wall 10*c* are inserted into recess 9*a*, and reinforcement member 10 is joined to dash floor 5 with ceiling wall 10*a* extending between the two edges of recess 9*a*. In this configuration, a closed cross-section is formed by dash floor 5 and reinforcement member 10.

Figure 10:
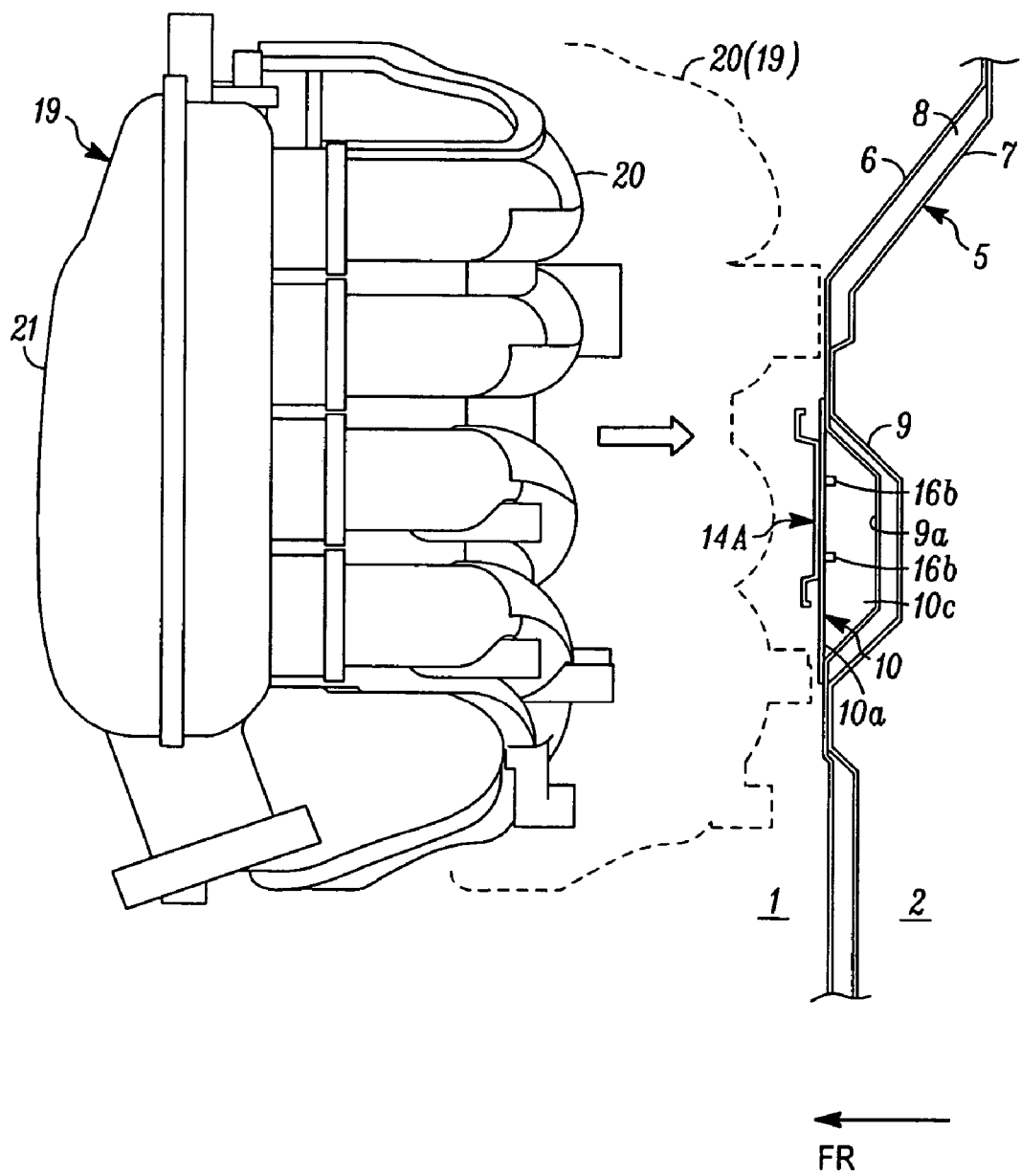
FIG. 10 is a plan view illustrating the vehicle body structure in accordance with the second application example (including cross-section C-C in FIG. 9)
Figure 11:
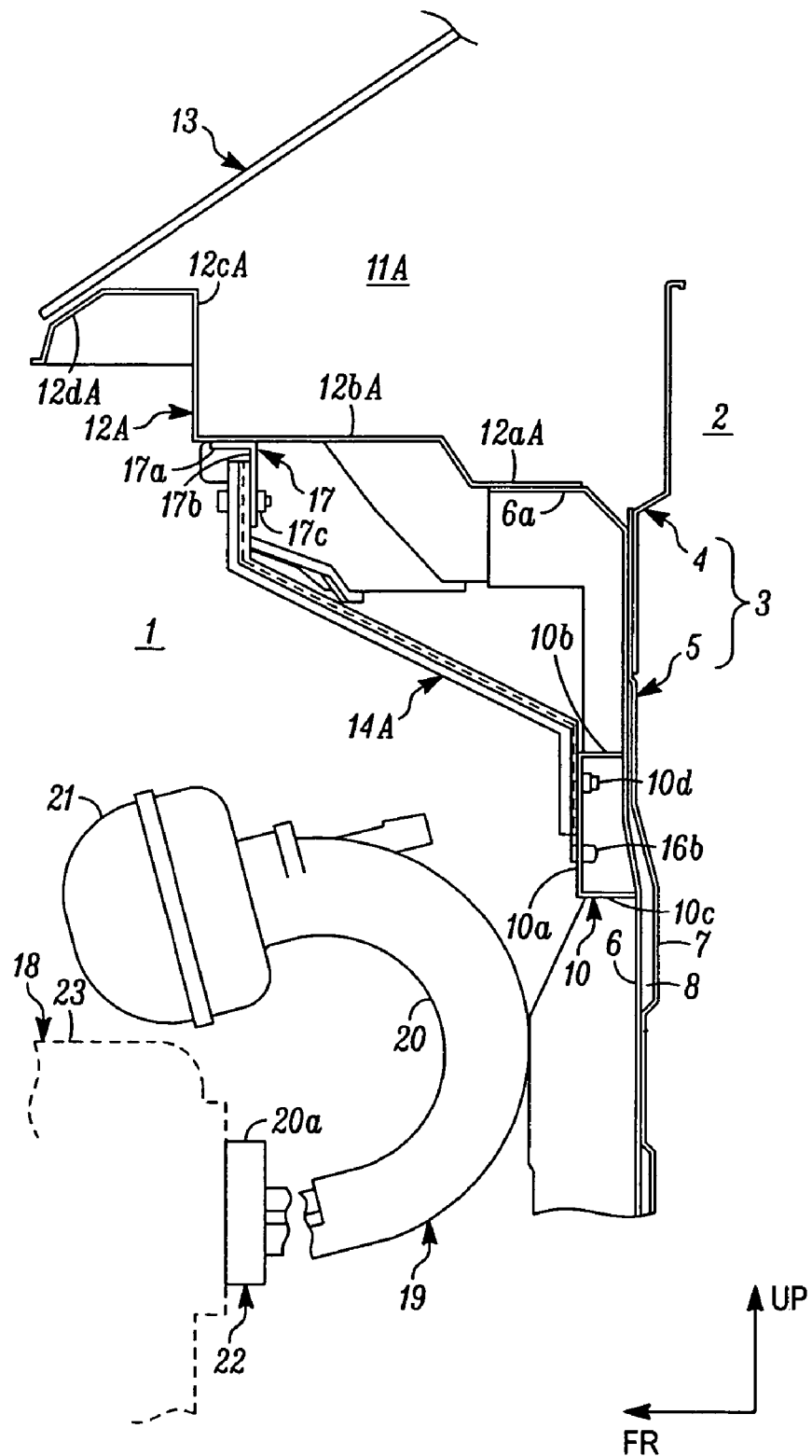
FIG. 11 is a longitudinal cross-section of the vehicle body structure when an impact occurs at the front of the vehicle in accordance with the second application example.

Linking member 14A in this embodiment is a strip-shaped sheet member made of metal formed into a crank shape as shown in FIGS. 8 and 9. As shown in FIG. 10, both longitudinal edges are bent into a hook-shaped cross-section to increase rigidity.

Dash panel 3 and air box 11A are then connected by the linking member 14A by fastener means such as bolts or welding joining the vertical ends of linking member 14A to dash panel 3 and air box 11A.

Linking member 14A is mounted on air box 11A using a bracket 17. As shown in FIGS. 8 and 9, bracket 17 has approximately an L-shaped profile and has a ceiling wall 17a and a hanging wall 17b. Bracket 17 is formed by bending a rectangular sheet member made of metal. Ceiling wall 17a is joined to the front end of the bottom surface of bottom wall 12bA of air box floor 12A. Linking member 14A and bracket 17 are connected by fastening a bolt passed through through-hole 25 formed at the top end of linking member 14A to a weld nut 17c furnished on bracket 17.

Linking member 14A and reinforcement 10 are also connected by fastening a bolt inserted through through-hole 16a formed at the lower end of linking member 14A to a weld nut 10d furnished on reinforcement 10. With this, linking member 14A is coupled to reinforcing part 9 of dash floor 5 through reinforcement 10. Note that the lower end of linking member 14A, which is the part connected with reinforcement 10, and intake manifold 19 are disposed in positions that overlap in the direction of the vehicle width. In addition, with this embodiment, while an insertion projection 16b is furnished below through hole 16a formed in linking member 14A, insertion hole 10e is furnished below weld nut 10d of reinforcement 10 so that insertion projection 16b is inserted in insertion holed 10e. With this, linking member 14A is positioned and provisionally held, so that the mounting operation can be accomplished more easily.

In addition, as shown in FIG. 2, while the front end of linking member 14A is connected to the front end at the lower surface of bottom wall 12bA of air box floor 12A, linking member 14A is mounted angled to the corner parts formed by dash floor 5 and air box 11 by connecting the back end of linking member 14A to reinforcement 10. Thereby, the support rigidity of air box 11A is increased. Also, the support rigidity of windshield glass 13 is increased.

The reinforcement member 10 is joined to reinforcing part 9 and the rigidity is increased. Since a closed cross-section is formed by joining the reinforcement member 10 to reinforcing part 9 of dash panel 3 extending between both edges of recess 9a, the rigidity of reinforcing part 9 is even further increased, and deformation of dash panel 3 can be better prevented. The rigidity of the connected section of linking member 14 is increased and an impact load can be more reliably transmitted to the air box by connecting linking member 14 to reinforcement member 10 and by connecting linking member 14A to the reinforcing part 9 through reinforcement member 10.

Since linking member 14A is connected to the front of air box 11A and extends at an angle to the corner of dash floor 5 and air box 11A, the support rigidity of air box 11A and the support rigidity of windshield glass 13 can be increased. There is also an advantage that the occurrence of noise caused by vibration of windshield glass 13 can be controlled.

Variations are, of course, possible. For example, the shape, placement, material and the like of the linking member can be changed in various ways, and various changes, such as forming the reinforcing part as a strip-like sheet member, are also possible. The fragile parts of the intake manifold can also be furnished using various methods, e.g., adding slits, providing joints using vibration welding, and the like. Also, although this structure is described with respect to the front of a vehicle, it could be implemented in other locations, such as the rear of a vehicle.

Also, the above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle body structure of a vehicle including an engine, comprising:
    a dash panel partitioning an engine chamber of the vehicle from a vehicle interior and having a dash panel width in a width direction of the vehicle;
    an engine intake manifold disposed in the engine chamber and having a first edge and an opposed second edge in the width direction of the vehicle defining an engine intake manifold width;
    an air box including a bottom wall, at least one front wall and a back wall defined by at least a portion of the dash panel, the air box extending in the width direction of the vehicle and located above the dash panel; and
    a linking member connected at one end to the dash panel and the air box and having a linking member width in the width direction of the vehicle smaller than both the dash panel width and the engine intake manifold width, at least a portion of the linking member over lapping a portion of a width of the vehicle defined by the first edge and the second edge of the engine intake manifold.

2. The vehicle body structure according to claim 1 wherein the linking member is connected to a side of the air box opposite the vehicle interior.

3. The vehicle body structure according to claim 1 wherein the linking member is connected to the dash panel and the air box by spot welding.

4. The vehicle body structure according to claim 1, further comprising:
    a reinforcing part extending vertically along the dash panel, the reinforcing part connecting the linking member to the dash panel.

5. The vehicle body structure according to claim 1 wherein the engine intake manifold further comprises a fragile part.

6. The vehicle body structure according to claim 3, further comprising:
    a side wall furnished on the linking member and extending in a longitudinal direction of the vehicle, the side wall being spot welded to the dash panel and the air box.

7. The vehicle body structure according to claim 4 wherein an upper portion of the reinforcing part is connected to the air box.

8. The vehicle body structure according to claim 4 wherein the reinforcing part forms a longitudinally rearward bulge in the dash panel.

9. The vehicle body structure according to claim 4 wherein the reinforcing part further comprises a reinforcement member.

10. The vehicle body structure according to claim 4 wherein at least a portion of the reinforcing part is positioned at a location on the dash panel where the dash panel would receive a pushing force from the engine moving toward the vehicle interior due to an impact external of the vehicle.

11. The vehicle body structure according to claim 9 wherein the reinforcing part further comprises:

a recess depressed longitudinally rearward; and wherein the reinforcement member extends horizontally between edges of the recess.

12. The vehicle body structure according to claim 9 wherein the linking member is connected to the reinforcing part through the reinforcement member.

13. The vehicle body structure according to claim 5 wherein the fragile part is furnished at an end of the engine intake manifold connected to the engine.

14. The vehicle body structure according to claim 5 wherein the engine intake manifold is approximately U-shaped with an upstream connection, a downstream connection and an opening directed forward longitudinally, the downstream connection vertically below the opening and the upstream connection vertically above the opening; and wherein the fragile part is on a peripheral wall at an upper portion of the downstream connection.

15. The vehicle body structure according to claim 5 wherein the fragile part is a series of steps in a peripheral wall of the engine intake manifold, the steps in the peripheral wall being thin.

16. The vehicle body structure according to claim 5 wherein the fragile part is steps in a surface around an outside of a peripheral wall of the engine intake manifold, the steps around the surface being thin.

17. A vehicle body structure for a vehicle, comprising:
 means for partitioning an engine chamber at a front of a vehicle from a vehicle interior positioned in back of the partition means, the partition means having a first width in a width direction of the vehicle;
 means for intaking engine air, the air intake means disposed toward the front of the vehicle from the partition means and having a first edge and an opposed second edge in the width direction of the vehicle defining a second width; and
 means for linking the partition means and an air box, the air box including a bottom wall, at least one front wall and a back wall defined by at least a portion of the partition means, the linking means having a third width in the width direction of the vehicle smaller than both the first width and the second width, the linking means connected at one end to the partition means and connected to another end to the air box and at least a part of the linking means overlapping a portion of a width of the vehicle defined by the first edge and the second edge of the air intake means.

18. A vehicle body structure for a vehicle, comprising:
 a dash panel partitioning an engine chamber from a vehicle interior and having a dash panel width in a width direction of the vehicle;
 an engine intake manifold disposed in the engine chamber and having a first edge and an opposed second edge in the width direction of the vehicle defining an engine intake manifold width; and
 a linking member connected to the dash panel and connectible at another end to an air box including a bottom wall, at least one front wall and a back wall defined by at least a portion of the dash panel, the linking member having a linking member width in the width direction of the vehicle smaller than both the dash panel width and than the engine intake manifold width, at least a portion of the linking member overlapping a portion of a width of the vehicle defined by the first edge and the second edge of the engine intake manifold.

19. The vehicle body structure according to claim 18, further comprising:
 a reinforcing part extending vertically along at least a portion of the linking member, the reinforcing part connecting the linking member to the dash panel.

20. A linking member for a body structure for a vehicle, the vehicle including a dash panel partitioning an engine chamber from a vehicle interior, the engine chamber housing an engine and an engine intake manifold, and the vehicle including an air box located above the dash panel, the linking member comprising:
 a first end connectible to the air box, the air box including a bottom wall, at least one front wall and a back wall defined by at least a portion of the dash panel;
 a second end connectible to the dash panel; and
 a vertically-extending portion extending between the first end and the second end; and wherein a maximum width of the first end, the second end and the vertically-extending portion in a width direction of the vehicle is smaller than both a width of the dash panel and a width of the engine intake manifold in the width direction of the vehicle and the first end and the second end are connectible respectively to the air box and the dash panel so that at least a portion of the linking member overlaps a portion of a width of the vehicle defined by outer edges of the engine intake manifold in the width direction of the vehicle.

* * * * *